United States Patent [19]
Grengs

[11] 3,844,531
[45] Oct. 29, 1974

[54] SLIDE VALVE
[76] Inventor: Norbert G. Grengs, 5645 Manton Ave., Woodland Hills, Calif. 96059
[22] Filed: May 29, 1973
[21] Appl. No.: 364,957

[52] U.S. Cl. .................. 251/327, 251/366, 251/329, 29/157.1 R, 29/470.3
[51] Int. Cl. ...................... F16k 41/04, F16k 27/10
[58] Field of Search ........... 251/329, 366, 367, 327; 29/157.1 R, 470.3

[56] References Cited
UNITED STATES PATENTS
205,626  7/1878  Frost .............................. 251/327 X
3,198,484  8/1965  Martindale ......................... 251/329
3,333,814  8/1967  Sargent ............................. 251/203

Primary Examiner—Arnold Rosenthal
Attorney, Agent, or Firm—Spensley, Horn & Lubitz

[57] ABSTRACT

A sliding gate valve assembleable from injection molded parts by ultrasonic welding techniques to provide an inexpensive valve having high resistance to leakage.

18 Claims, 13 Drawing Figures

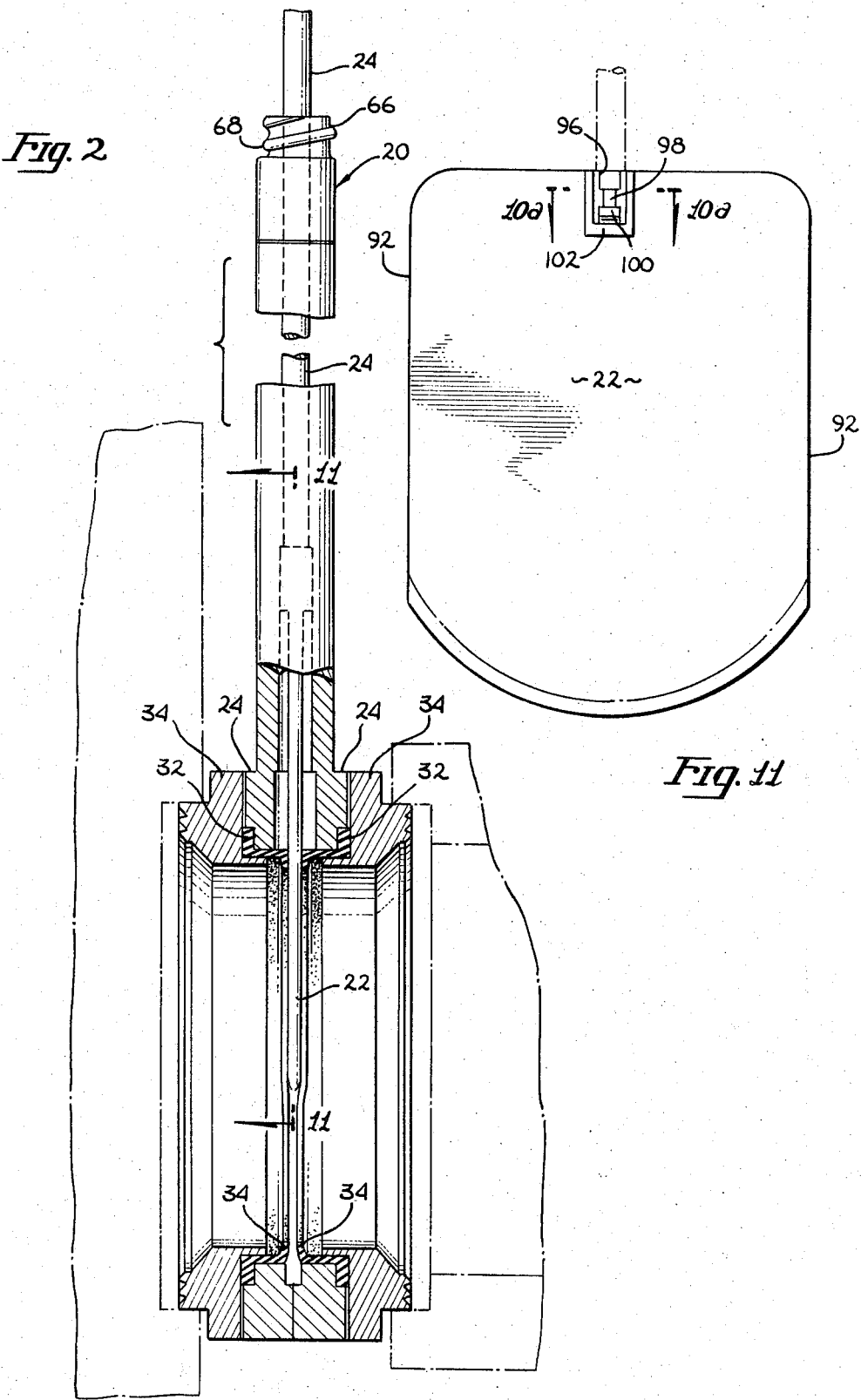

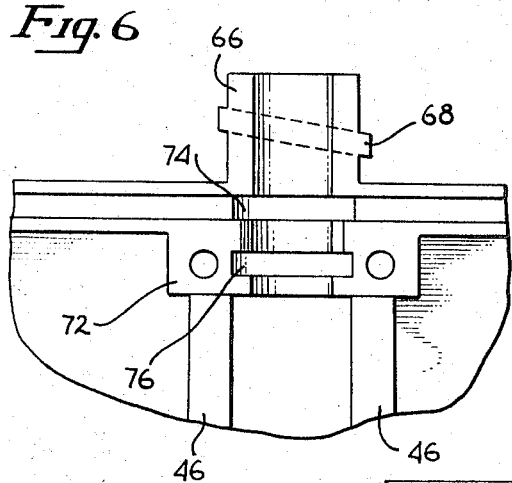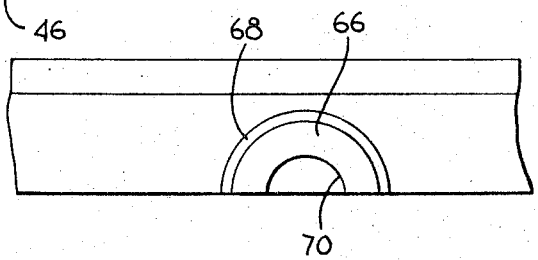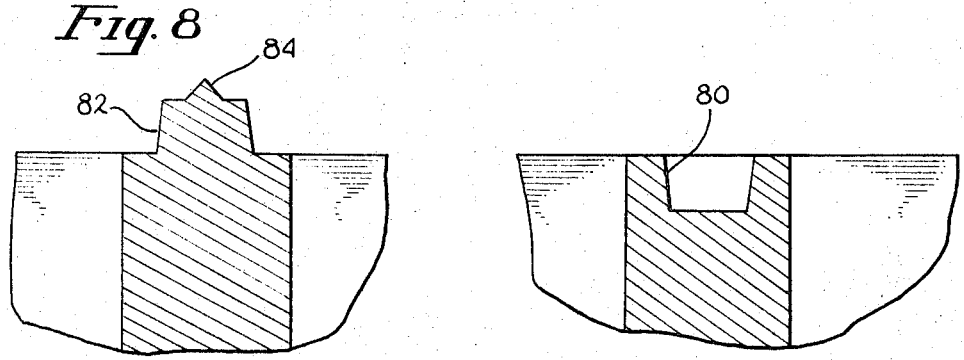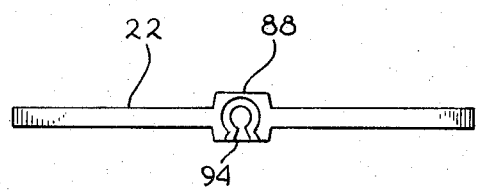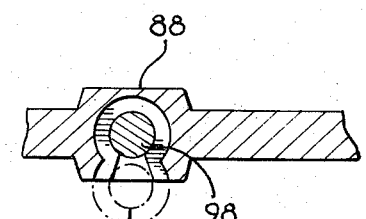

SLIDE VALVE

BACKGROUND OF THE INVENTION

1. Field of the Invention

The present invention relates to the general field of plumbing and irrigation equipment, and more specifically to sliding gate valves as commonly used in waste systems of recreational vehicles, motor homes, trailers and the like.

2. Prior Art

Sliding gate valves suitable for production by injection molding techniques are well known in the prior art. Such valves are commonly used as part of the waste disposal system on mobile homes, campers and the like. Valves for such a use are typically on the order of three-inch valves, and must operate in a generally unsanitary atmosphere under reasonably low pressures but without leakage. Accordingly, reliable operation without leakage, particularly around the stem actuating the gate, is a necessity, as leakage in this type of environment is highly undesirable and the cost of replacement of the valve may be more than the valve itself. On the other hand, the reliable and leak-free operation must be achieved simply and automatically if the price of the valve is to be maintained within competitive limits.

One prior art gate valve is shown in U.S. Pat. No. 3,350,056 entitled Sealing Means for a Gate Valve. This patent generally discloses a type of seal for generally sealing the gate to close the valve which has been found to perform quite well. It does not, however, perfectly prevent leakage into the gate chamber, even when a thin metal gate is used, and does not prevent such leakage at all when a thicker plastic gate is used. Accordingly, it does not alleviate the necessity of maintaining a high integrity seal around the stem actuating the gate. The body of that valve is generally bolted or riveted together, an assembly which may in itself result in leakage, as the mating surfaces of injection molded parts characteristically do not mate and seal perfectly when merely bolted together.

Another type of gate valve is shown in U.S. Pat. No. 3,333,814 entitled Wedge Gate Valve Assembly. This valve is a substantially unsymmetrical configuration using a single seal on one side of the gate, and coupling the stem of the actuating member to the gate on the opposite side of the gate. A member is screwed to the top of the valve to wedge the gate firmly in place, and apparently the use of additional metallic parts are also used to retain some type of seal operative against the stem.

Still another type of gate valve known in the prior art utilizes a basic one-piece body, with the gate chamber being defined by a removable mold insert. This construction generally eliminates the body leakage problem of the two prior designs by eliminating the joint between the two body halves. The design further utilizes a cap-like member over the top of the valve body where the stem or rod actuating the gate extends outward from the body. This cap-like member is solvent welded to the body and entraps an O-ring on the stem between the cap and the body. It should be noted, however, that no real O-ring groove, as such, may be provided, as the cross-section of the opening in the valve body adjacent the stem breakout may be no smaller than the deeper portion of the cavity, and of course no smaller than the maximum cross-section of the gate which must pass therethrough on assembly. Thus while an O-ring seal is provided, the proper seat for such a seal cannot be provided, and leakage is an often recurring problem.

There is, therefore, a need for a gate valve generally similar to those known in the prior art but which may be more easily assembled to provide improved leak-proof characteristics in the final assembly.

BRIEF SUMMARY OF THE INVENTION

A sliding gate valve assembleable from injection molded parts by ultrasonic welding techniques to provide an inexpensive valve having high resistance to leakage. The valve body is assembled from two body members, one being a male member and the other being a female member adapted so as to be sonic welded to provide a leak free, high integrity valve body having a pair of O-ring grooves around the gate actuating rod for compressing and sealing against O-rings riding on the rod. The rods and gates are adapted to snap together with a lock nut snapping onto the valve handle for locking the handle in a closed position to the valve body. A provision is made for interchangeably receiving alternate flange members to provide the required mating with the waste system with which the valve is used.

BRIEF DESCRIPTION OF THE DRAWINGS

FIG. 2 is a cross-section of the valve of FIG. 1.

FIG. 6 is an expanded view taken along lines 6—6 of FIG. 3.

FIG. 7 is a top view of the body member portion of FIG. 6.

FIG. 8 is a cross-section equivalent to a cross-section taken along lines A—A of FIG. 3 illustrating the cross-section of the ultrasonic welding region of the male body member.

FIG. 9 is the cross-section equivalent to FIG. 8 for the female body member.

FIG. 10 is the top view of the gate.

FIG. 10a is a cross section taken on an expanded scale along lines 10a—10a of FIG. 10.

FIG. 11 is a face view of the gate.

DETAILED DESCRIPTION OF THE INVENTION

Figure 1:
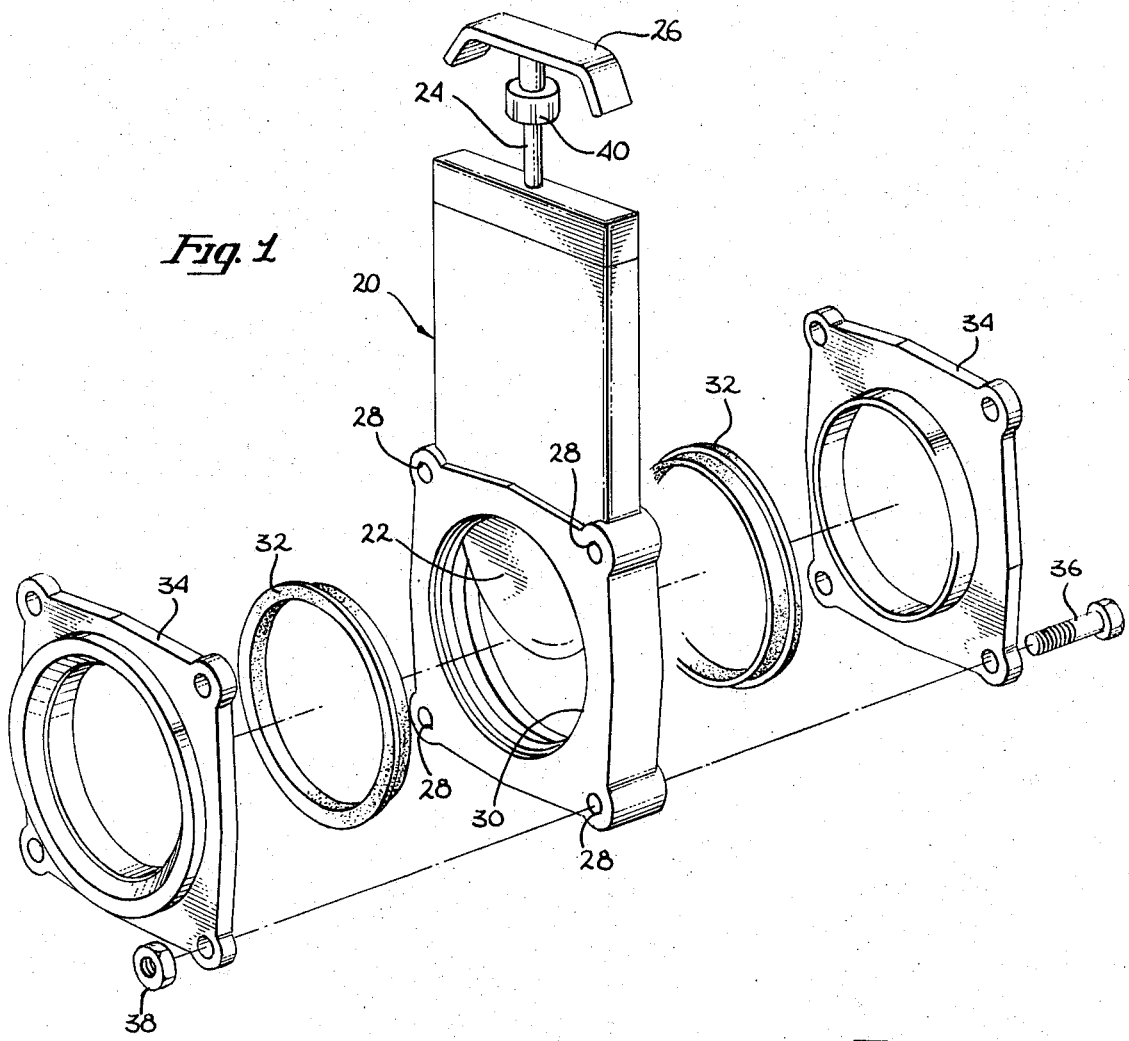
FIG. 1 is an exploded perspective view of the gate valve of the present invention.

First referring to FIGS. 1 and 2, a perspective exploded view and a cross-section of the valve of the present invention may be seen. The assembly of a complete valve is comprised of a principal valve body assembly 20 containing gate 22, actuating rod or stem 24 and a handle 26 thereon. The valve body 20 has a pattern of bolt holes 28 therethrough about an angular depression 30 on each side of the valve assembly to receive seals 32. The seals 32 may be retained in position by removable flange plates 34, with the entire assembly of seals, flange plates and valve assemblies being bolted together by bolts 36 and nuts 38. As shall subsequently be seen, the passages for holes 28 in the valve assembly 20 through which bolts 36 pass are not in communication with the flow chambers, so that leakage through the holes 28 is prevented, not by reliance upon the sealing characteristics of the bolts and nuts, but instead on their being sealed from any moisture or contamination from within the valve assembly. The removable flange plates 34 provide a further function of allowing the interchange, or selection, of such flange plates to mate with the adjoining portions of the waste system in accordance with any particular requirements of a user of such valves. Another feature of the invention which may be seen in this figure is the lock nut 40, which may be used to lock the handle 26 and thus gate 22 in the valve closed position.

Now referring specifically to FIG. 2, the cross-section of the seals 32 may be seen. The seals are configured and disposed so as to provide seal faces in face-to-face adjacent disposition at a separation less than the thickness of the gate. The lower edge of the gate is tapered, and the gate itself is preferably of a self lubricating plastic so as to easily slide up and down between the two seals to open and close the valve in a leak-proof manner.

Figure 3:
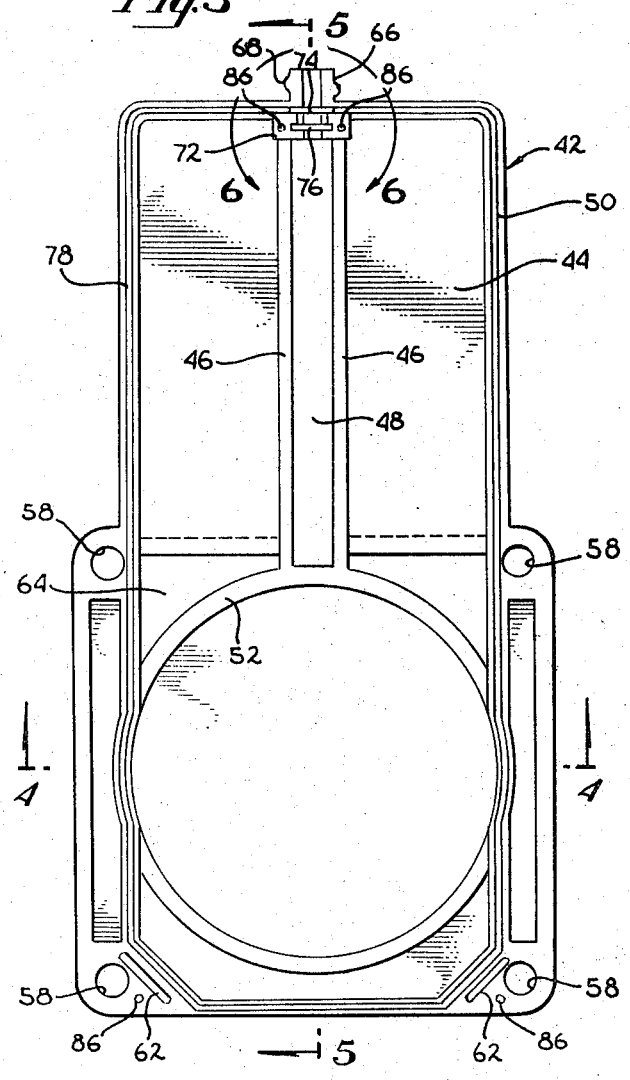
FIG. 3 is a view of one of the two valve bodies.
Figure 5:
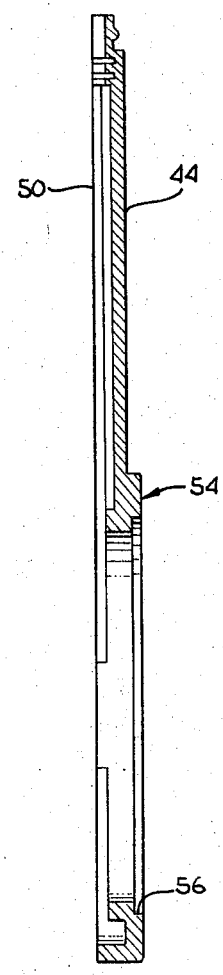
FIG. 5 is a cross-section of the body member of FIG. 3.
Figure 4:
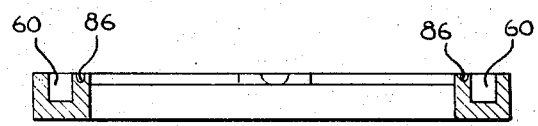
FIG. 4 is a cross-section taken along line 4—4 of FIG. 3 of the female body member.

Now referring to FIGS. 3 through 5, many of the details of the first and second body members which, when ultrasonically welded together, will comprise the body assembly 20, may be seen. These body members are identical in most respects; one difference being only to provide male and female portions on the first and second members respectively for locating the ultrasonic welding, and the other substantial difference being in the top portion thereof so that the two members may cooperate to define a single turn screw thread for engagement by a lock nut 40. Thus, it will be understood that while the female member is specifically shown in FIGS. 3, 4 and 5, the male portion is identical except as hereabove and hereinafter specifically described.

Each body member has an upper portion, generally indicated by the numeral 42, having an outer wall 44 of uniform thickness, with a pair of rectangular raised integral members 46 defining a slot 48 within which a portion of the gate may slide. Generally surrounding the outer wall 44 is a raised edge 50 defining the abutting surfaces for the first and second body members when they are joined, the raised edge containing either the male or the female mating portions for the ultrasonically welded joints. The face of raised areas 46 of the two body members, when assembled, are in spaced apart disposition by an amount slightly greater than the thickness of the gate so as to allow the gate to freely slide therebetween. At the same elevation and as a continuation of the face of protrusion 46 is an interrupted annular region 52 which in the assembly provides further guidance for the motion of the gate. In this region of the body members is the enlarged portion, generally indicated by the numeral 54, having an annular depression 56 on the outer wall for receiving and locating the seals 32, and having bolt hole pattern 58 therethrough in regions of full thickness of the molded part.

In order to eliminate distortion due to uneven cooling and shrinkage, to minimize the amount of material required, and to minimize the length of time required for the molding to be sufficiently cooled to maintain its dimensional stability, it is desirable to maintain substantially uniform wall thicknesses wherever possible. Accordingly, depressed areas 60 and 62 are provided so as to maintain this uniform wall thickness as much as reasonably possible, and to avoid whenever possible solid regions of bulk material. Similarly, depressions 64 in the inner face of the first and second body members are provided to follow the protrusions of the outer face in the region 54 so as to maintain substantially uniform wall thickness in this area.

Now referring also to FIGS. 6 and 7, an exploded view taken along lines 6—6 of FIG. 3, and a top view of the body members may be seen, respectively. Protruding upward at the top of the body members is a semi-annular protrusion 66 having on the outer wall thereof a portion of a screw thread 68, and on the inner wall thereof a hemicylindrical surface 70, which in cooperation with the abutting body member will define a cylindrical flight area for supporting the stem or actuating rod coupled to the gate. There is also provided an enlarged region 72 having one-half of a first O-ring groove 74, and one-half of a second lower O-ring groove 76.

Now referring also to FIGS. 8 and 9, typical cross-sections of the male and female body members, such as a cross-section taken along lines A-A of FIG. 3 may be seen. These figures illustrate the detail of the mating areas adapted for ultrasonic welding, indicated generally by the numeral 78 in FIG. 3. On the female member there is provided a small trapezoidal depression 80 extending generally around the periphery of the inner face of the female body member, terminating only at the edges of periphery of the O-ring groove 74 (see FIG. 6). Similarly, on the male member is a trapezoidal protrusion 82 having the same pattern as the trapezoidal depression 80 in the female member so as to mate therewith, with the protrusion 82 further having a small triangular protrusion 84 which will contact the bottom of the trapezoidal depression 80 in the female member and concentrate the heat at that point to cause the melting, flowing and joining of the adjacent material. The nominal plan-form of the male protrusion is the same as the plan-form of the female depression, so that the parts may readily slide together for ultrasonic welding, notwithstanding any small misalignments or distortion, and be guided home during ultrasonic welding by the taper of the trapezoidal regions. Also, to aid in the alignment of the parts, particularly in the critical regions surrounding the O-ring grooves 74 and 76, there is provided in addition a plurality of alignment pins and cooperatively disposed depressions 86 on each body members to further aid in the alignment of the body members.

It should be noted that the plan-form of the male and female regions defining the region of ultimate ultrasonic welding is such as to pass within the bolt hole pattern 58 (see FIG. 3). Thus, as previously mentioned, these holes are external to the sealed valve assembly and do not present any potential leakage in that region.

Now referring to FIGS. 10, 10a and 11, a side view, cross-sectional view and a top view of the gate 22 may be seen. The gate is a member of substantially uniform thickness, except for the small region 88 of greater thickness and the tapered lower edge 90 forming an inclined plane for insertion between the seals 32 during closure of the valve. The width of the gate is slightly less than the internal space between the edges 50 (FIG. 3) of the upper portion of the valve body, and the width of region 88 of greater thickness is slightly less than the width of depression 48, so that the valve gate may freely slide between the two body members. The region of increased thickness 88 is generally rectangular in plan-form, having a tapered slot opening 94 communicating with a first cylindrical region 96, a smaller diameter cylindrical region 98 and finally a larger cylindrical region 100 substantially the same diameter as region 96. Cylindrical region 100 terminates at a perpendicular inner wall adjacent the lower edge of the region 88.

Figure 12:
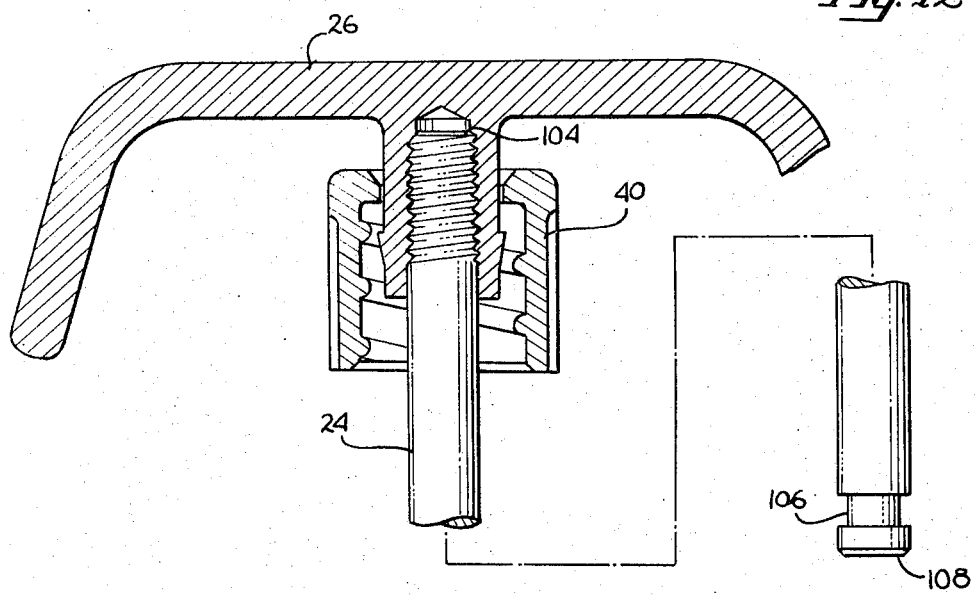
FIG. 12 is a partial cross sectional view of the handle-nut-actuating rod assembly.

Now referring to FIG. 12, a cross-section of the sub-assembly comprising handle 26, actuating rod 24 and nut 40, may be seen. The handle 26 is of any convenient configuration and is provided with a molded, internally threaded region 104 receiving the threaded end of the actuating rod 24. The nut 40, preferably of a plastic such as polyethylene, has an upper chamfered surface 41 so as to be forceable over mating chamfer 43 on the handle during assembly so that the nut may snap into the position shown and subsequently resist removal thereon. The lower end of the actuating rod 24 is provided with an annular recess 106 so that the lower end of the actuating rod 24 may be snapped into the cylindrical regions of enlarged area 88 of gate 22. Further, the dimensions of the lower end of the actuating rod 24 and of the cylindrical regions in the gate are chosen so that on the closing of the valves, the force on actuating rod 24 is transmitted to the gate 22 by the abutment of end 108 of the rod with surface 102 on the gate.

Having now described in detail the individual parts making up the valves of the present invention, the manner of assembly of the valves will now be described. In the preferred embodiment, the actuating rods 24 are first fabricated and delivered to the injection molding machine molding the handles 26. The actuating rods are placed in the die so that the handle is molded in place, with the subsequent shrinkage of the handle firmly coupling the handle and rod. The nut 40 is later snapped in place, and one or two O-rings are pushed onto the actuating rod. The gate 22 and the lower end of the actuating rod 24 are then snapped together resulting in a firm linear drive connection between these two members, particularly with regard to pressure on the actuating member in a direction so as to close the finished valve but with free rotation between these two members so that the handle may not be unscrewed and torque may not be transmitted to the gate.

The next step in the assembly is to place the handle actuating rod gate assembly in one of the body members, disposing the two O-rings in the two ring grooves 74 and 76. (In the event only one O-ring is used, it should be placed in the O-ring groove 74, as the final and ultimate seal is created by the O-ring in this location). Thereafter the mating body member is placed over the first body member, and the entire assembly is placed in an ultrasonic welder for welding along the male/female junction. The proportions of the actuating rod 24, the O-rings and the O-ring grooves should be selected so that some compression of the O-rings results as the two body members move into face-to-face abutment during ultrasonic welding. Accordingly, with the O-rings and O-ring grooves 74, the flow of material during ultrasonic welding eliminates any crack or separation at the base of the O-ring groove where the two body members meet, and will allow material flow to result in a continuous circular O-ring groove with the O-ring therein in a state of at least some compression. To assure the desired end result, the alignment between the two halves in the regions in which the ultimate circular O-ring groove is formed is particularly critical, and to assure proper alignment the alignment pins and depression 86 are provided immediately adjacent the O-ring groove in each of the body members. After ultrasonic welding, the two seals 32 may be placed in position, and the desired flange plates bolted in position to complete the assembly.

There has been described herein a gate valve having improved leakage characteristics and reliable operation yet being relatively inexpensive to manufacture. By way of example, the manner in which the actuating rod snaps into the gate allows the sub-assembly of these parts prior to assembly thereof with the valve bodies. Also, the particular configuration for this snap-in arrangement allows the portion of the valve bodies facingly disposed to the gate to be symmetrical, as the gate itself is substantially symmetrical about its center plane. Further, a symmetrical arrangement of the gate and the fact that the actuating rod axis lies in the center plane of the gate assures that the actuating forces transmitted between actuating rod and the gate act directly on the gate without applying any bending moments thereon (e.g. an offset attachment of the actuating rod to the gate would require unsymmetrical body members of varying thickness and would result in distorting forces on the gate, thereby interfering with the smooth operation thereof and at times tending to unsnap the actuating rod from the gate. The use of ultrasonic welding to join the two body members allows the design of the two body members for minimum injection molding time, and minimizes the problems of shrinkage, distortion, etc. caused by regions of different thickness though the final gate assembly appears to be an integral assembly substantially as strong as those using a one piece body. In this regard, ultrasonic welding may be readily controlled to provide repeatable results, whereas prior art valves having any solvent welded connections are not as repeatable in appearance or result. (Solvent welding may be used in the assembly of the present invention is desired.) Other features of the valve include the lock nut made captive with respect to the valve handle by merely pushing the lock nut into place. In the preferred embodiment, the lock nut is made out of polyethylene so as to readily temporarily deform for snapping in place over the tapered flange on the lower portion of the handle, yet be tightenable onto the threaded protrusion of the valve assembly so as to lock the handle in the valve closed position (with the handle in any desired orientation, usually parallel to the valve itself). Even if the valve handle is inadvertently forced to the open position in opposition to this nut, it will yieldably deform without breaking or substantially deteriorating so as to be reusable by snapping the nut back in place. The combination of the ultrasonic joint and the location of the joint with respect to the major O-ring groove allows sealing around the actuating rod with a high degree of integrity, the allowance of the second O-ring providing a seal for operation at higher pressures if required. Also, while the invention has been disclosed and described with respect to a preferred embodiment, it will be understood by those skilled in the art that various changes in form and detail may be made therein without departing from the spirit and scope of the invention.

I claim:

1. In a sliding gate valve of the type having a provision for connecting to a pair of fluid conduits and having a body within which a gate may slide between first and second positions by operation of an actuating rod extending from the body, the improvement comprising a valve body assembleable by ultrasonic welding from first and second body members, an actuating rod coupled to a gate and an O-ring:

each of said body members having first surfaces and being assembleable with said first surfaces in face to face disposition, said first body member having a substantially continuous depression surrounding the area within which the gate will slide and the area through which fluid may flow, said second body member having a substantially continuous raised area mateable with said depression, said raised area having a further protrusion thereon to engage the bottom of said depression and to ultrasonically weld thereto, said first and second body members each having a local relief on said first surface which, when the first and second body members are assembled allows free passage of said actuating rod therethrough, each said relief having thereon a portion of an O-ring groove, said depression and said raised area of said body members each terminating at said O-ring groove, whereby said gate and said actuating rod with an O-ring on said actuating rod may be placed in position between said first and second body members before ultrasonic welding so that said O-ring seals against said body members and said actuating rod after ultrasonically welding of said body members.

2. The gate valve body of claim 1 wherein said first and second body members are of substantially uniform thickness.

3. The gate valve body of claim 1 wherein each of said first and second body members has an integral extending member extending outward from said body members and forming a continuation of said relief, each said extending member having a portion of a screw thread thereon so as to define a screw thread substantially concentric to said actuating rod when said valve body is assembled.

4. The valve body of claim 3, further comprised of a handle and lock nut, said handle and said actuating rod having cooperative means for attaching said handle to the outer end of said actuating rod, said handle having an integral lock nut engaging member substantially concentric with said actuating rod and extending toward said valve body, said lock nut engaging member having an enlarged region therein, said lock nut being internally threaded adjacent one end thereof so as to be threadedly engageable with said screw thread on said extending member, the other end thereof having an opening substantially concentric with said screw threads, said opening and said enlarged region being cooperative to encourage said opening over said enlarged area for assembly of said lock nut to said handle, and to resist removal therefrom.

5. The valve body of claim 4 wherein said enlarged region is generally conical, said opening being smaller in diameter than the largest diameter of said enlarged region and having a chamfered face, whereby said chamfered face cooperatively engages said enlarged region to encourage said opening over said enlarged region for assembly purposes.

6. The valve body of claim 5 wherein said first and second body members are similar members except for said portions of a screw thread, said depression and said raised area, said gate being of generally uniform thickness and slideable between said first and second body members, said gate having an enlarged area adjacent one edge thereof, said actuating rod having a first generally cylindrical section adjacent gate end thereof and a second generally cylindrical section adjacent and substantially smaller in diameter than said first generally cylindrical section, said enlarged area of said gate having a cooperatively disposed opening having its axis substantially on the center plane of said gate for mateably receiving said first and second generally cylindrical sections of said actuating rod, said opening being slotted through one side thereof whereby said actuating rod may be snapped into said gate.

7. The valve body of claim 1 wherein said first and second body members are similar members except for said depression and said raised area, said gate being of generally uniform thickness and slideable between said first and second body members, said gate having an enlarged area adjacent one edge thereof, said actuating rod having a first generally cylindrical section adjacent gate end thereof and a second generally cylindrical section adjacent and substantially smaller in diameter than said first generally cylindrical section, said enlarged area of said gate having a cooperatively disposed opening having its axis substantially on the center plane of said gate for mateably receiving said first and second generally cylindrical sections of said actuating rod, said opening being slotted through one side thereof whereby said actuating rod may be snapped into said gate.

8. The valve body of claim 1 wherein said relief on said first and second body members each has a portion of a second O-ring groove thereon, whereby a second O-ring on said actuating rod may be placed in position between said first and second body members in said second O-ring groove before ultrasonically welding of said body members.

9. The valve body of claim 1 wherein said depression and said raised area of said body members each terminate at the base of said portion of said O-ring groove.

10. In a sliding gate valve of the type having a provision for connecting to a pair of fluid conduits and having a body within which a gate may slide between first and second positions by operation of an actuating rod extending from the body, the improvement comprising a valve body assembleable by welding from first and second body members, an actuating rod coupled to a gate and an O-ring:

each of said body members having first surfaces and being assembleable with said first surfaces in face to face disposition, said first body member having a substantially continuous depression surrounding the area within which the gate will slide and the area through which fluid may flow, said second body member having a substantially continuous raised area mateable with said depression to weld thereto, said first and second body members each having a local relief on said first surface which, when the first and second body members are assembled allows free passage of said actuating rod therethrough, each said relief having thereon a portion of an O-ring groove, said depression and said raised area of said body members each terminating at said O-ring groove, whereby said gate and said actuating rod with an O-ring on said actuating rod may be placed in position between said first and second body members before welding so that said O-ring seals against said body members and said actuating rod after welding of said body members.

11. The gate valve body of claim 10 wherein said first and second body members are of substantially uniform thickness.

12. The gate valve body of claim 10 wherein each of said first and second body members has an integral extending member extending outward from said body members and forming a continuation of said relief, each said extending member having a portion of a screw thread thereon so as to define a screw thread substantially concentric to said actuating rod when said valve body is assembled.

13. The valve body of claim 12, further comprised of a handle and lock nut, said handle and said actuating rod having cooperative means for attaching said handle to the outer end of said actuating rod, said handle having an integral lock nut engaging member substantially concentric with said actuating rod and extending toward said valve body, said lock nut engaging member having an enlarged region therein, said lock nut being internally threaded adjacent one end thereof so as to be threadedly engageable with said screw thead on said extending member, the other end thereof having an opening substantially concentric with said screw threads, said opening and said enlarged region being cooperative to encourage said opening over said enlarged area for assembly of said lock nut to said handle, and to resist removal therefrom.

14. The valve body of claim 13 wherein said enlarged region is generally conical, said opening being smaller in diameter than the largest diameter of said enlarged region and having a chamfered face, whereby said chamfered face cooperatively engages said enlarged region to encourage said opening over said enlarged region for assembly purposes.

15. The valve body of claim 14 wherein said first and second body members are similar members except for said portions of a screw thread, said depression and said raised area, said gate being of generally uniform thickness and slideable between said first and second body members, said gate having an enlarged area adjacent one edge thereof, said actuating rod having a first generally cylindrical section adjacent gate end thereof and a second generally cylindrical section adjacent and substantially smaller in diameter than said first generally cylindrical section, said enlarged area of said gate having a cooperatively disposed opening having its axis substantially on the center plane of said gate for mateably receiving said first and second generally cylindrical sections of said actuating rod, said opening being slotted through one side thereof whereby said actuating rod may be snapped into said gate.

16. The valve body of claim 10 wherein said first and second body members are similar members except for said depression and said raised area, said gate being of generally uniform thickness and slideable between said first and second body members, said gate having an enlarged area adjacent one edge thereof, said actuating rod having a first generally cylindrical section adjacent gate end thereof and a second generally cylindrical section adjacent and substantially smaller in diameter than said first generally cylindrical section, said enlarged area of said gate having a cooperatively disposed opening having its axis substantially on the center plane of said gate for mateably receiving said first and second generally cylindrical sections of said actuating rod, said opening being slotted through one side thereof whereby said actuating rod may be snapped into said gate.

17. The valve body of claim 10 wherein said relief on said first and second body members each has a portion of a second O-ring groove thereon, whereby a second O-ring on said actuating rod may be placed in position between said first and second body members in said second O-ring groove before welding of said body members.

18. The valve body of claim 10 wherein said depression and said raised area of said body members each terminate at the base of said portion of said O-ring groove.

* * * * *